June 2, 1964  S. J. JACOBS  3,135,155
HIGH SPEED CAMERA WITH ROTATING MIRROR AND
OPTICAL FOCAL PLANE SHUTTER
Filed June 13, 1961  5 Sheets-Sheet 2

INVENTOR.
S. J. JACOBS

BY *W. O. Quesenberry*
*O. E. Hodges*
ATTYS

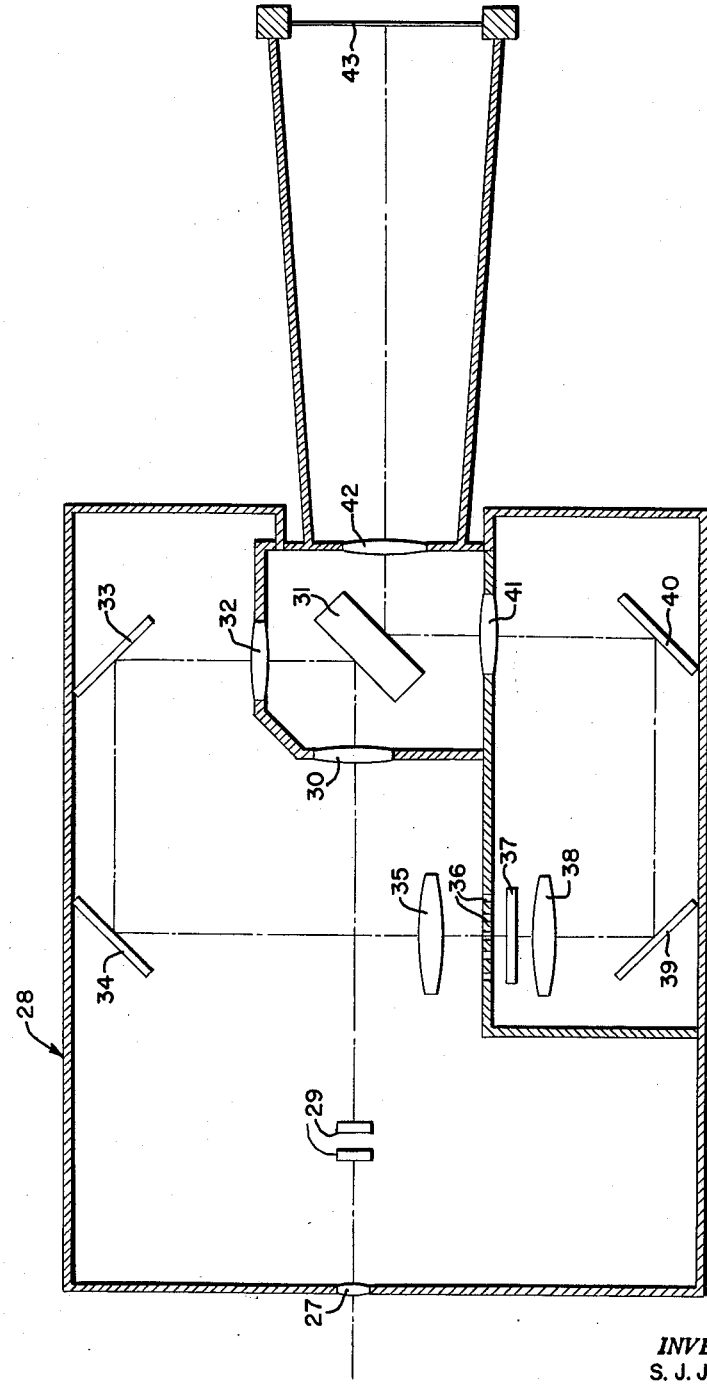

June 2, 1964

S. J. JACOBS 3,135,155

HIGH SPEED CAMERA WITH ROTATING MIRROR AND
OPTICAL FOCAL PLANE SHUTTER

Filed June 13, 1961

INVENTOR.
S. J. JACOBS

BY
ATTYS.

June 2, 1964 S. J. JACOBS 3,135,155
HIGH SPEED CAMERA WITH ROTATING MIRROR AND
OPTICAL FOCAL PLANE SHUTTER
Filed June 13, 1961 5 Sheets-Sheet 5

INVENTOR.
S. J. JACOBS
ATTYS.

United States Patent Office 3,135,155
Patented June 2, 1964

3,135,155
HIGH SPEED CAMERA WITH ROTATING MIRROR AND OPTICAL FOCAL PLANE SHUTTER
Sigmund J. Jacobs, Silver Spring, Md., assignor to the United States of America as represented by the Secretary of the Navy
Filed June 13, 1961, Ser. No. 116,890
4 Claims. (Cl. 88—16)
(Granted under Title 35, U.S. Code (1952), sec. 266)

The invention described herein may be manufactured and used by or for the Government of the United States of America for governmental purposes without the payment of any royalties thereon or therefor.

This invention relates to a high speed camera, and in particular to a rotating mirror framing camera which uses an optical focal plane shutter arrangement.

Various prior art cameras have been developed for photographically recording rapidly varying phenomena which may persist for a few milliseconds at most. Prior art cameras did not record a photograph with a continuous time component or correlation.

The cameras of the prior art have had a serious limitation of resolving the inter-relation between lens aperture and shutter speed, such that total space resolution and a fast shutter speed have not been compatible for a given intensity.

The camera of this invention overcomes the disadvantages of the prior art by a new and novel combination for achieving a good space resolution by use of a combination of lenses, mirrors, including a rotating mirror and a slit or slits acting as optical focal plane shutters. The cameras use a rotating mirror to transfer one or more images from one or more lenses to a stationary film. The images are first focused to pass through one or more narrow slits in the optical path between two reflections of the rays from one or two surfaces of the rotating mirror before the beam is reimaged on the recording surface. It is convenient to use both the front and back surfaces of a rotating mirror but for some purposes it may be preferable that both reflections occur from the same surface. The narrow slits are located in the camera housing such that only the light rays passing through the slits will be recorded on the film. These slits act as a focal plane shutter. Thus, at any one instant of time, a narrow increment of the multiple images is being recorded on the film.

The increments of the images sweep across the film surface at a speed defined by the rotating speed of the mirror and the optical lever arm for the reflected beam off the mirror. The time relationship between the first increment and any other increment may therefore be determined.

It is an object of this invention to provide a new and improved high speed camera having a plurality of aperture lens.

Another object is to provide a new and improved high speed camera having an effective framing rate exceeding $10^6$ frames per second with good image intensity and space resolution.

Still another object is to provide a new and improved means of recording physical phenomena which occur in an exceedingly short time interval.

A further object is to provide a new and improved focal plane shutter camera with isolating means for substantially eliminating stray light rays on the recording surface.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 3 is a modification of FIG. 1 utilizing another optical device for obtaining images with good resolution at a high rate of framing speed;

Figure 1:
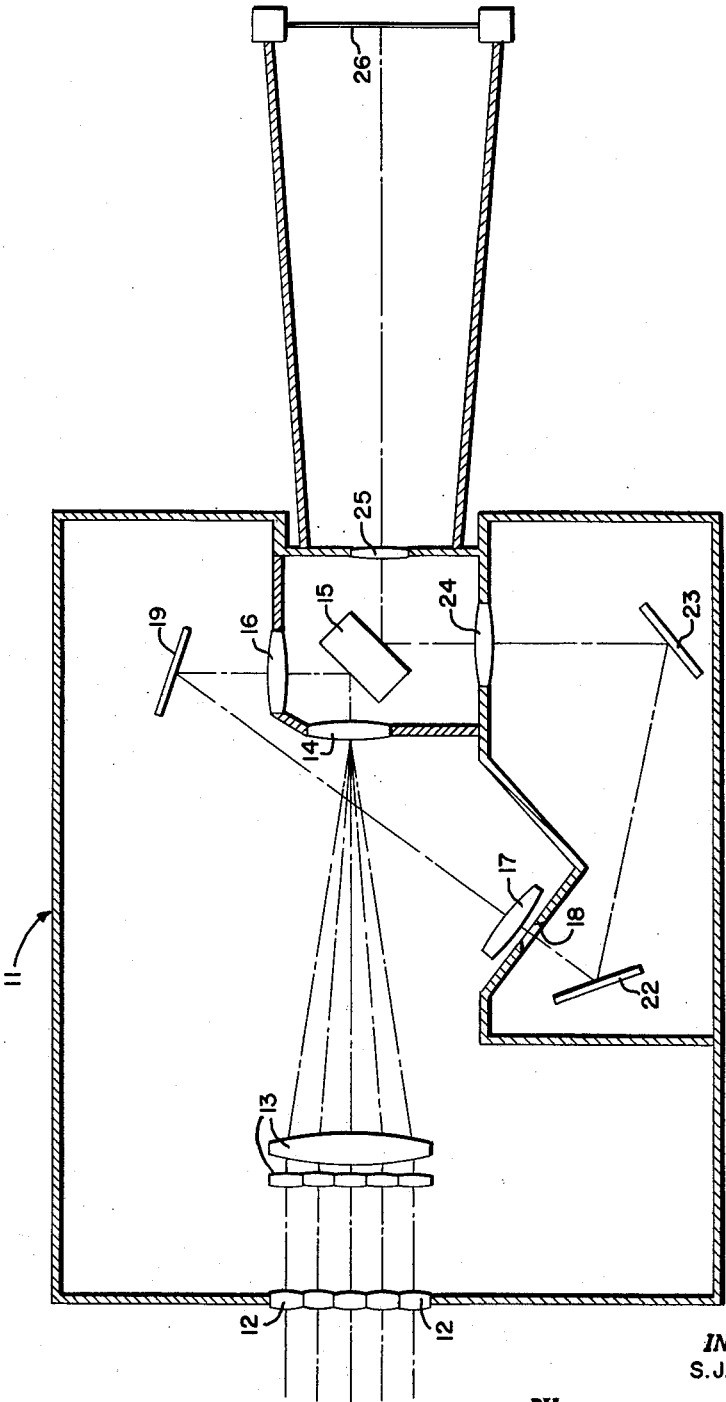
FIG. 1 is a plan view partially in section of one embodiment of the invention.

Cameras in general can be considered to be of two basic classes based on the placement of the shutter. There are (1) between or at-the-lens shutter and (2) focal plane shutters. The essential difference between at-the-lens and focal plane shutters is that, in the former case, the entire picture area is exposed simultaneously with intensity varying with time according to the lens area opened as a function of time. In the focal plane camera a curtain is placed very near the film plane. An aperture in this curtain is flashed across the film plane. The entire time of exposure of the image is given by the time it takes the slit in the curtain to travel the length of the film plus the width of the slit. By making the slit narrow the exposure of any element of the film may be quite small. The aperture width may be reduced without changing the area or $f$ number of the lenses employed. Thus the total exposure of a given frame varies linearly with the exposure time. When it is desired to reduce the exposure time it becomes necessary to reduce the width of the lens opening. If this is done the exposure on the film is found to vary as the square of the exposure time. For comparison, a focal plane shutter camera of a given $f$ number can be compared to an in-the-lens shutter camera having the same maximum lens aperture. Two such cameras which give the same exposure at a given shutter time will be found to give $\frac{1}{25}$, the exposure for the in-the-lens shutter and $\frac{1}{5}$ the exposure for the focal plane shutter if the exposure time is reduced to $\frac{1}{5}$ of the reference value. For $\frac{1}{10}$ the exposure time the respective exposures would be $\frac{1}{100}$ and $\frac{1}{10}$ respectively. The focal plane shutter would be five times more effective exposure-wise in the first case and 10 times more effective in the second. The at-the-lens shutter camera has an additional disadvantage in this comparison when the loss of resolution due to the effect of optical diffraction is taken into consideration.

Applicant has invented a camera using an optical focal plane shutter which has an exposure that is directly proportional to the exposure time.

The continuous nature of slit writing with an optical focal plane shutter makes it profitable to use multiline writing to increase the effective frame rate. By forming five rows and eight columns of lenses a plurality of exact images are created. The images are also essentially equal in size and so disposed that images recorded under one slit of width $XF/5$ would precisely add up to one frame which could be reconstructed by projection onto a film with suitable optics, $XF$ being the width of the frame.

The scan could be by a slit in a rotating drum or by a rotating mirror with suitable optics as will be described in greater detail later. In general with N lines of images staggered $XF/N$ between lines the effective framing speed becomes N times that of a single line. The use of a vertical slit allows time, on the record, to be a linear function of the horizontal position.

As a data recording instrument the ability to reconstruct the image frames is inconsequential since the position-time data are the information of prime interest.

Use of more than one slit may be made for either increasing the total number of frames, thus increasing the writing speed in frames per second or increasing the total number of frames at a given framing speed. If, instead of one slit as shown in FIG. 1, two slits are used, spaced $XF/10$ apart, the information scanned when the slits travel a distance $XF/10$ will add up to one complete frame. If each slit is of width $W=XF/10$ the information on the five rows covered by the two slits will add up to one frame. If each slit writes on an independent film area stationary relative to the images, two sets of images will be formed. In these images isotime lines will be separated $XF/10$ from one film strip to the other. The case of two slits doubles the number of frames recorded in a given time thus doubling the framing rate. Three slits spaced $$\frac{XF}{15}$$

will triple the framing rate. Frame rate multiplication will be given by the product, row times slits relative to a single row and single slit.

Figure 2:
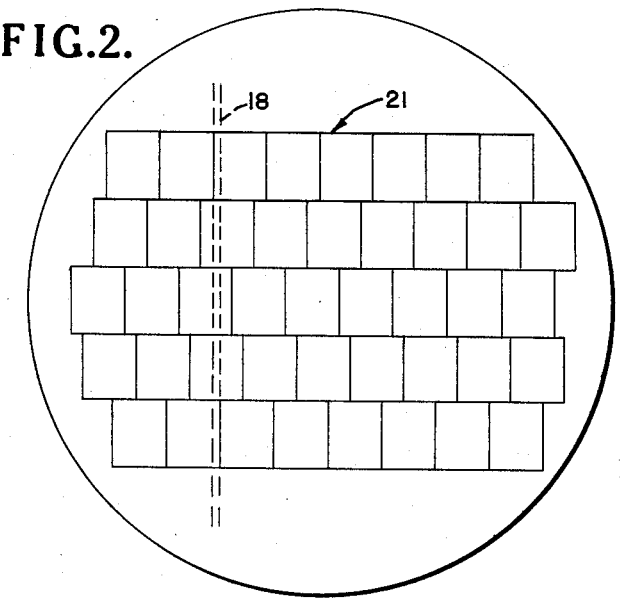
FIG. 2 is an image layout showing the location and time relation of each image with respect to the remaining images.

Referring now to the drawings, where like reference characters designate like or corresponding parts throughout the several views, there is shown in FIG. 1 an optical focal-plane shutter camera 11. There are 43 individual lenses 12 mounted in camera 11. The lenses are mounted in rows 8 or 9 wide and 5 deep and are all mounted in a parallel relation in such manner that each lens has a full view of the image field. Lens combination 13 consists of 43 rectangular primary field lenses mounted in an array as shown by 21 of FIG. 2, and having focal lengths equal to those of lenses 12 combined with a secondary field lens of such size as to accept light from each of the 43 primary field lens and having a focal length equal to that of lens 14. Lenses 12 form 43 images in a plane located approximately at a position midway between the primary and secondary field lenses of combination 13. The lens combination 13 serves to project the light from each and every lens of 12 into the lens of 14. Lenses 14 and 16 in combination form a principle lens system for projecting images from 13 to the slit at 18. The rays carrying the images from 13 to 18 are reflected from the front surface of rotating mirror 15 to mirror 19 and pass through field lens 17. The rotation of mirror 15 imparts a translational motion to the image at 18. The image field 21 as viewed by the slit 18 is shown in FIG. 2. The image field 21 is moving with respect to the slit due to the rotation of mirror 15. The scanned image is now reflected by mirrors 22 and 23 to lens 24. The images are refocused by lens 24 and lens 25 to form image segments on the photo sensitive surface at 26. The back surface of rotating mirror 15 is used to reflect the beam from lens 24 to lens 25. With reference to FIG. 1, the optical path is reflected twice from the rotating mirror, i.e., once from the front and once from the back surface. The optical path is in addition reflected from three fixed mirrors 19, 22 and 23. In addition, the optical path length or optical lever arm from lens 16 to slit 18 is equal to the optical path length or optical lever arm from slit 18 to lens 24. The combined effect of an odd number of reflections from fixed mirrors in the plane of FIG. 1; equal path lengths before and after forming an image at the slit 18; and two reflections from the rotating mirror results in virtually complete cancellation of image motion at film 26 for any focal distance for the images seen by lens 14 and the images projected from lens 25.

If this camera were to be constructed with lenses 14, 16, 24 and 25 of 20-inch focal length and with a rotating mirror two inches wide and two and one-half inches high, the image field of FIG. 2, each image 9 x 12 mm., could be recorded at $2 \times 10^6$ frames per second using a rotor speed of 600 r.p.s. The $f$ number of the camera would be approximately $f/12$. A 4" x 5" plate back would be used at 26.

The $f$ number could be changed by changing the size of image and the film distance. For example, if 25 were reduced to 10 inches focal length the $f$ number could be reduced to $f/6$ with images 4.5 x 6.0 mm.; if 25 were to be extended to 40 inches, the $f$ number would be approximately $f/24$ and the images would be 18 x 24 mm.

The following data are recited as an example for those skilled in the art and should not be considered as a limitation since a large number of variations are possible. A specific design for example would be as follows:

| | |
|---|---|
| Number of primary images | 43 (+2) |
| Size of primary images | 0."5 x 0."375 |
| Focal length of lenses for primary images | 1"–4" |
| Focal length lenses 14, 16, 24, 25 | 20" each |
| Diameter lenses 14, 16, 24, 25 | 3" each |
| Rotating mirror width | 2" |
| Rotating mirror thickness | 1" |
| Focal plane slit | Variable 0."002 to 0."080 |
| Film size | 4" x 5" |
| Approximate $f$ number | $f/12$ |
| Mirror speed | 600 r.p.s. |
| Framing speed | $2 \times 10^6$/sec. |
| Total complete frames | 38 |
| Total frames (80% of are complete) | 40 |
| Final image size | 0."5 x 0."375 |

FIG. 1 presents a complicated piece of equipment in that all the lenses of 12 must be matched for size and located with precise image centering in order that one slit $XF/5$ in width will see exactly the content of one image for each of 40 equal positions across the field as shown in FIG. 2. This is a very difficult job to perform and may be considered somewhat of a disadvantage.

Referring now to FIG. 3, five lenses 27 are mounted in camera 28 approximately normal to the plane of the drawing, each lens having a full view of the image field. The field lens combination 29 is made up of five rectangular lenses facing 27 and having focal lengths equal to that of each of the five lenses of 27 and one lens facing lens 30 large enough to transmit the rays from the five rectangular lenses, this lens having a focal length equal to that of lens 30. The rectangular lenses of 29 have the orientation of $I_1$ to $I_5$ of FIG. 4a. In the camera illustrated in FIG. 3, these lenses are equal in size to each image of FIG. 4b. The five lenses of 27 are located to center five images in a plane within or near the rectangular field lenses. As in the previous description the lens combination 29 serves to transmit the rays from each of the lenses of 27 to lens 30. The lens combination 30, 32 act together to focus the images at 29 to the slit plane at 36 by way of reflection from the front surface of rotating mirror 31 and the fixed mirrors 33 and 34. Lenses 35 and 38 act as a field lens combination to transmit the rays forming the images from lens 32 to 41. The multiple images are translated across the slits by rotation of mirror 31. The image segments which pass through the slits 36 pass through a number of dove prisms at 37, one prism being used for each slit, the rays then are reflected by mirrors 39 and 40. Lens combination 41 and 42 is used to form images on the light sensitive surface at 43 using a reflection from the back surface of rotating mirror 31. In all there are five reflections from fixed mirrors in the path from lens 32 to 41. The combination of equal optical distances from lens 32 to slits 36 and from slits 36 to lens 41, an odd number of reflections from fixed mirrors and two reflections from the rotating mirror produces stationary images at 43 as in the previous description. The mirror 31 is sufficiently thick to prevent any light rays from crossing directly from lens 30 to lens 42.

By use of applicant's alternate arrangement shown in FIG. 3, the number of lenses can be reduced to a number equal to the number of rows desired on the film. By use of multiple slits the number of images on the film image field have been multiplied by the number of slits involved. In FIG. 3 the number of lenses 27 have been reduced to five with images $I_1$, $I_2$, $I_3$, $I_4$ and $I_5$ which are normal to the plane surface of the drawing. The images are offset one to the next by a separation of $XF/10$, $XF$ being the desired image spacing in the plane of the drawing. The six slits 36 and six dove prisms 37 mounted behind each of the slits are spaced by a factor $XF/2$. This arrangement results in a frame field as shown in FIG. 4b. By the use of six slits it is assured that there will be 25 equally spaced time samples for each point in the image field. If nine slits and nine prisms were used at least 40 equally spaced time samples would be available. A few of the frames are lost in each frame field at the beginning and end due to the necessary offset of the images. An even number of plane mirrors $M_1$ must now be used in the projected light path to result in stationary images on the film. The dove prisms supply the fifth reflection to make up the odd number of reflections to compensate image motion of the film.

An advantage is gained from this design in that the framing rate is doubled. Using the same rotor speed and type of lens previously cited would result in a framing rate of $4 \times 10^6$ f.p.s.

If the speed of the rotating mirror were increased to a speed of 2400 r.p.s. it would be possible to increase the writing speed of the camera to approximately $16 \times 10^6$ f.p.s. This speed for the rotating mirror is considered to be feasible with present day techniques without adverse distortion.

Figure 4A:
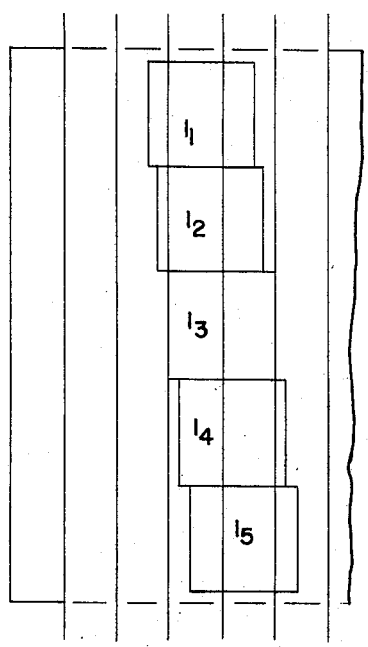
FIGS. 4A and 4B illustrate a view partially broken away of an image layout as it is received by the light sensitive recording means.
Figure 4B:
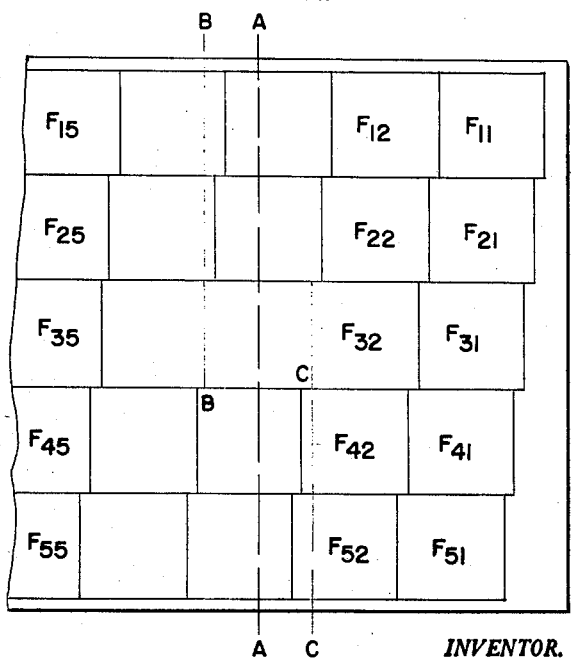

In the frame array of FIG. 4 it can be shown that there are two vertical lines on each row of images which represent a given value of time. Line AA is one and lines BB and CC represent the second line for a specific time. The analysis of isotime conditions throughout the frame field of FIG. 4b can be made in two ways. The images of FIG. 4a may be considered to be moved to the right across the fixed slit lines while the film moves to the left with the same displacement. At any instant the motion may be arrested and the regions being recorded on the film simultaneously are then the sections of the image seen under the slits. The result of the above is equivalent to passing N lines spaced $XF/2$ across the frame field $F_{11}$ to $F_{56}$ the first subscripts for F representing the row on which the frame is located and the second subscript representing its column. The lines are labeled 1 to 6 from right to left. The line grid is placed over the image field with line 1 at the right of $F_{11}$. This position of the grid represents zero time. If the grid is now moved to the left, time will be proportional to the distance of line 1 from the zero position. At any position of the grid representative of a given time the picture elements recorded at that time are found by the fact that $K^{th}$ line will only represent a recorded position if it coincides with the $K^{th}$ frame in a given line. For illustration the third slit from the right in this analyzer will only correspond to a recorded position in the frame field if it lies over the third frame from the right in any of the rows of image frame. The time for any X position satisfying this condition is then given by the position of the first line relative to the same reference.

Figure 5:
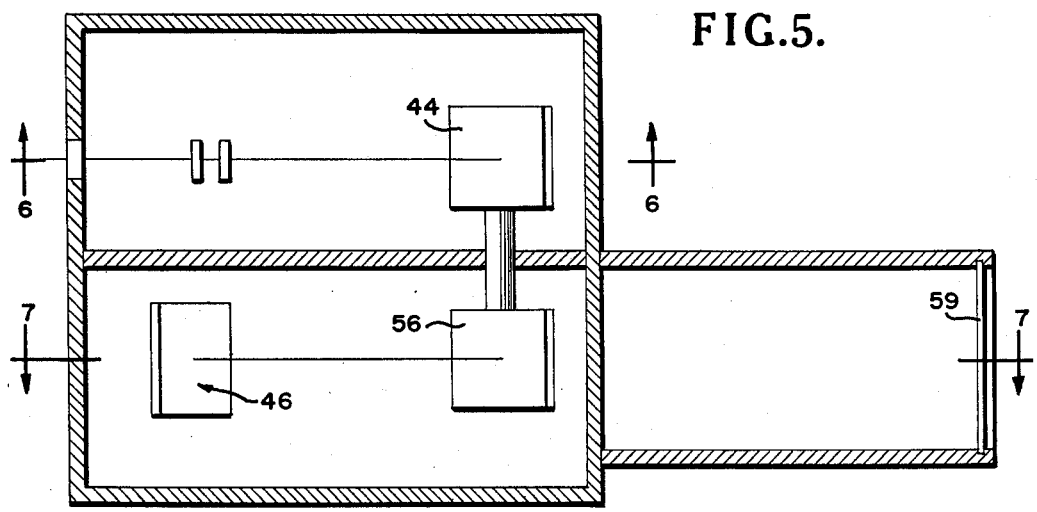
FIG. 5 is a modification of the camera in FIG. 3 utilizing a second plane to avoid all residual stray light rays.
Figure 6:
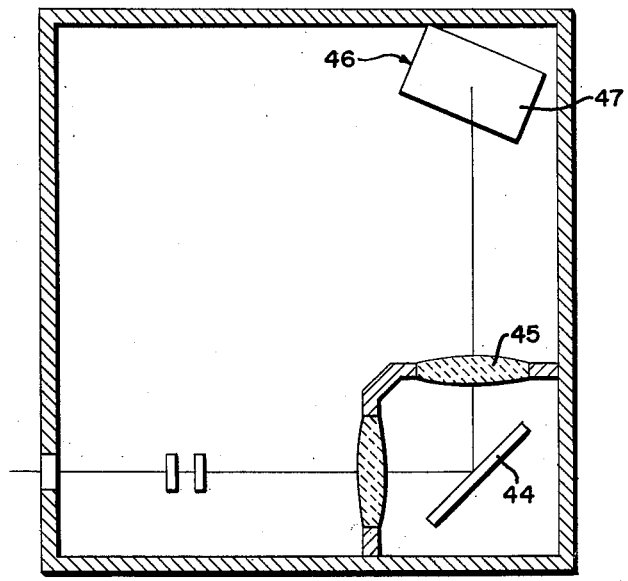
FIG. 6 is a view of FIG. 5 taken along lines 6—6.
Figure 7:
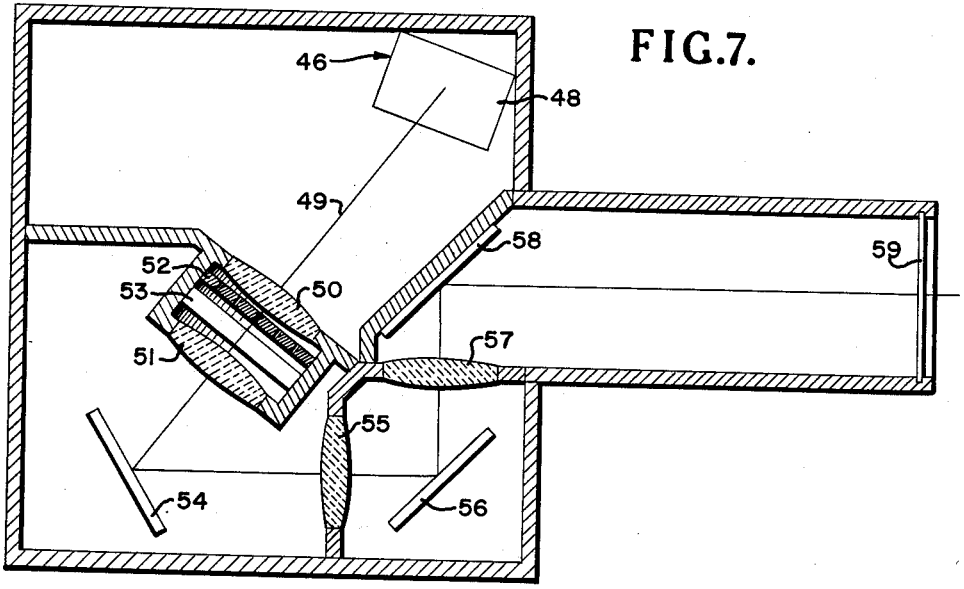
FIG. 7 is a view of FIG. 5 taken along lines 7—7.
Figure 8:
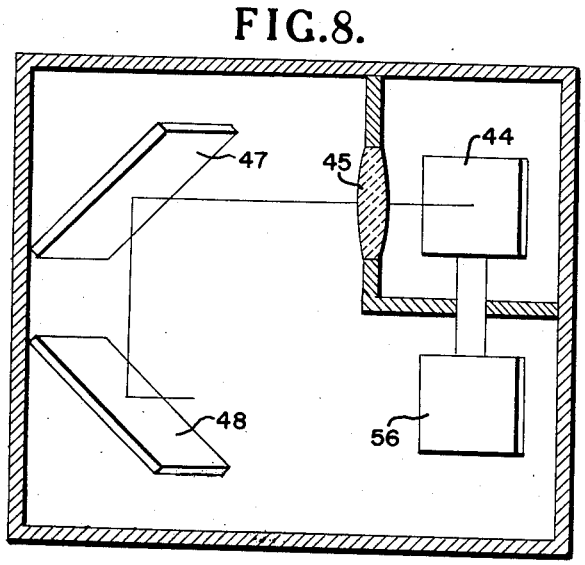
FIG. 8 is a partial view of FIG. 5 illustrating the angle mirror pair.

Refer now to FIG. 5 wherein the light rays enter the camera substantially in the same manner as recited for FIG. 3 and being reflected by rotating mirror 44 as can be seen in FIG. 6. Mirror 44 reflects the rays through lens 45 to a right angled mirror pair 46. The rays are reflected from the top portion 47 of the mirror to the bottom portion 48 of the mirror, FIG. 8, where it is reflected along path 49 to a lens 50 as shown in FIG. 7. Lens 50 and 51 act as a field lens combination to transmit the rays forming the images from lens 45 to 55. The multiple stages are translated across the slits by rotation of mirror 44. The image segments which pass through the slit 52 pass through a number of dove prisms 53. While the use of dove prisms is recited it is recognized that the function performed by the dove prisms could be achieved by other optical means. For example, a three mirror system could be utilized or fiber optical bundles of glass fibers properly oriented could be used. Either method would give image inversion similar to that achieved by the dove prisms. Lens combination 55, 57 is used to form images on the light sensitive surface at 59 using a reflection from the rotating bottom mirror 56 and mirror 58. This design completely eliminates the possibility of stray light rays entering the film area. It is considered obvious that if very narrow slits were to be used, the dove prisms could be omitted. The frames would still appear intact being formed by what might be termed image dissection followed immediately by a restoration of the relative positioning of the image sections on the film.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A device for taking high-speed photographs comprising first lens means for obtaining a plurality of identical images, rotatable means having at least two reflecting surfaces for reflecting said plurality of images, second lens means for focusing the rays from said plurality of images on a first reflecting surface on said rotatable means, an optical means for relaying and focusing the plurality of reflected images, a narrow slit means located at the focusing point of said optical means for passing each portion of said plurality of images over a given period of time, reflecting means to transmit the image segments to a second surface of said rotatable means, and lens means to reform the image segments on a film.

2. A high-speed camera comprising a casing, said casing having a plurality of light admittance openings, a film holder on said casing, a lens system aligned with said openings for providing an image corresponding to each opening and for focusing said images, a rotating mirror with a pair of reflecting surfaces mounted for rotation within said casing at the focal point of said lens system, said mirror operable to reflect the light rays of an object to form an image which moves at a given speed, at least one slit in an enclosed housing located in such manner as to pass only a small portion of the images at a time as the images are moved past the slit by the rotation of the surface of said rotating mirror, fixed mirror means located in said enclosed housing for reflecting said small portions of said images to a second surface of said rotating mirror and thence to the film holder, and means for driving said rotating mirror at a given speed whereby all the multiple images are reflected at a predetermined rate on a film held in said film holder.

3. In a high-speed camera of the type holding a strip of film in a fixed position and utilizing a focal plane shutter in the optical system thereof, means mounted in said camera for providing and focusing a plurality of images, a rotatable mirror mounted in the optical path of said last-named means having a pair of reflecting surfaces for reflecting the plurality of images, means for reflecting and focusing the plurality of images in an optical path to the rear surface of said rotatable mirror, and slit means interposed in the focal path at the optical plane of the plurality of images in such a manner as to pass the multiple of images in a time relationship, to a strip of film.

4. In a camera of claim 3 wherein said slit means is located in a housing means for protecting the light sensitive means from substantially all stray light rays other than those passing through said slit means.

References Cited in the file of this patent

UNITED STATES PATENTS

| | | |
|---|---|---|
| 2,400,887 | Miller | May 28, 1946 |
| 2,816,476 | Rogers et al. | Dec. 17, 1957 |
| 3,012,470 | Bohn et al. | Dec. 12, 1961 |